United States Patent Office 2,977,239
Patented Mar. 28, 1961

2,977,239

LIGHT WEIGHT AGGREGATE AND METHOD OF MAKING SAME

Joseph R. Parsons, Park Forest, Ill., assignor to Chicago Fire Brick Company, Chicago, Ill., a corporation of Illinois No Drawing. Filed Aug. 13, 1958, Ser. No. 754,706

7 Claims. (Cl. 106—288)

The invention relates to a light weight aggregate and to a method of producing such a light weight aggregate from water granulated slag.

The development of light weight aggregates for concrete and structural materials was first accomplished in rotary kilns using carbonaceous shales and clay as the material for expanding. Later, cindering grates with premixed modulated clays with coke or coal as a fuel were developed, which allowed very high tonnages of light weight aggregate to be produced.

Also, blast furnace slags were expanded in their molten condition, using steam or water as the foaming or expanding medium. The lack of suitable facilities and the difficulties of working with molten slag were such that the products were never extensively used.

All of the aforementioned materials produced aggregates weighing from 40 to 60 lbs. per cubic foot, depending upon their screen sizing, and would produce in concrete mixes a concrete that weighed from 90 to 110 lbs. per cubic foot.

An object of this invention is the manufacture of high strength aggregates suitable for replacing sand in concrete mixes at a marked reduction in over all weight. This is entirely different from the use of large particles of bloated clays or shales which normally replace the crushed stone in concrete mixes. Workability in the light weight mixes is usually obtained by either increasing the amount of concrete used or crushing some of the light weight aggregate to fine particles to give a suitable mix of fine to coarse material. With the fine globules of the expanded slag which I obtain from my process, I can obtain workability without sacrificing weight or using excessive amounts of concrete.

Another object of my invention is to provide particles which will yield aggregates weighing as little as 9 to 11 lbs. per cubic foot.

A further object of the invention is to manufacture a light weight aggregate which has suitable strength and refractoriness for use in the manufacture of high temperature insulating castables.

Other objects and advantages of the invention will become apparent as the following description progresses.

These objects are accomplished by forming a mixture consisting essentially of water granulated slag and finely divided or pulverized particles of a silica bearing mineral, agitating the mixture at a temperature sufficient to soften and bloat the slag, whereby low density globules of the slag coated with the silica are produced.

A suitable temperature range is from approximately 1800° F. to 2300° F., depending on speed of feed. A preferred method of agitating the mixture is by tumbling the mixture in a short rotary kiln.

This invention required considerable experimentation, and the first work with water granulated slags was not successful.

Water granulated slag is a cheap and readily available material. Water granulating slag offers the steel companies a method of rapid disposal of the waste slag from their blast furnaces; discharging the waste slag into excessive amounts of water shatters the material into extremely fine particles, the majority passing through a six mesh screen.

The water granulated slag as produced contains both light weight particles and also strong glassy particles, having a true specific gravity of approximately 160 lbs. per cubic foot. However, the bulk density of the light to dense particles yields a weight of 37 to 45 lbs. per cubic foot with one to five percent of the particles light enough to float on water. The water granulated slag as produced was, therefore, of little value as a light weight aggregate.

The first idea was simply to heat the water granulated slag in a fast-heating furnace such as used in the perlite industry. However, the slow expanding sulphur gases, due to the sulphur entrapped in the slag during the water treatment, did not respond like the explosive entrapped water found in the perlite ores. It seemed that, regardless of the size of the furnace, only a few of the lighter particles could be expanded in these high speed furnaces.

Next, the rotary type furnace, similar to those used in the expansion of shales and clays, was tried. However, due to the fine particles of the water granulated slag, the slag particles fused to the side of the furnace and to each other, and at temperatures of 1900° to 2100° F., the slag formed a very non-uniform, porous mass; the material did not have uniform strength, and was of little value as an aggregate.

Ground clays were then tried as a separating medium. Here some aggregate could be produced, but the mass was a non-uniform cinder of poor strength.

Further trials were then conducted with silica sands of various meshes. The coarse sands seemed to bridge between the aggregate, forming large quantities of useless cinder with small percentages of useful aggregate. However, as I continued my work with silica sands of finer grain, higher percentages of acceptable aggregate were produced; 140 mesh pulverized silica produced a non-sticky matrix in the furnace, and gave uniform light weight spheres, of which 89 percent would float on water.

I continued my work with various types of silica bearing material and other pulverized inorganic material. I found that any pulverized material containing chemically combined water would retard the over all expansion of the aggregate. The presence of chemically combined water, such as that present in clay, produced aggregates black in color, while the fine silica and other siliceous material not containing chemically combined water yielded a pleasant, light cream aggregate of unusual strength for its weight.

Furthermore, the use of pulverized material containing chemically combined water retarded the final expansion of the aggregate, while the use of silica bearing material not containing chemically combined water resulted in weights of as little as 15 lbs. per cubic foot, and with selected samples, of 9 to 11 lbs. per cubic foot. The minerals containing chemically combined water gave aggregates ranging from 18 to 22 lbs. per cubic foot.

The proportion of the fine silica bearing material to the water granulated slag also appeared to be critical. For example, the use of pulverized silica showed the following behavior:

15 percent added to water granulated slag resulted in the production of unsatisfactory conglomerates, similar to the results of the use of coarse ground clays;

33 percent pulverized silica resulted in satisfactory aggregate and very little dust was emitted from the furnace. Chemical analysis shows that part of this silica is chemically combined on the surface of the aggregate, giving it more viscosity and better expansion behavior;

40 percent silica resulted in very uniform, spherical aggregate, but the furnace operation became dusty, showing an excessive amount of silica had been used.

Satisfactory results were obtained with from about 20 percent to 60 percent of silica, and preferably from 30 percent to about 35 percent.

The following chart shows the effect of particle size and type of silica bearing material on the density of the aggregate:

Chart I

| | Water Granulated Slag As Received | Expanded Water Granulated Slag Coated with the following materials— | | | |
|---|---|---|---|---|---|
| | | 12-Mesh Clay | 20-Mesh Silica Sand | 65-Mesh Silica Sand | 140-Mesh Pulverized Silica |
| Loose Weight per Cu. Ft., lbs. | 37–40 | 32–34 | 29–31 | 17–20 | 12–14 |
| Sink Float Test, Percent Floated | 4 | 7 | 20 | 51 | 89 |
| Weight/Cu. Ft. of Refractory Castable Using 25% of Each Aggregate, lbs. | 106 | 95 | 90 | 85 | 64 |

All slags screen thru 4-mesh on 10-mesh for conformity

The furnace I prefer for the successful operation of my invention consists of a short, stubby rotary kiln in which the entire bloating process can be accomplished in from one to ten minutes. The motion of the kiln should be slow: I prefer this to be in the range of one to two r.p.m. It seems necessary to bloat the slag in motion to obtain uniformity, but any excess speed results in excessive loss of the separating medium.

As water granulated slag is a conglomerate of light to very dense particles and my invention expands or bloats these to approximately uniform spherical globules, the time in the furnace for the individual particles varies greatly. For this reason I prefer a horizontal furnace in which the draft is so set that, as the lighter particles are raised to the top of the moving mass, they are swept from the furnace by the velocity of the burning gases. This gives me a uniform natural selection of the particles as they expand in what I choose to call deep bed bloating of the water granulated slag.

It may be of interest to note that particles of iron slag accumulate at the bottom of this deep bloating bed and must be occasionally removed to establish again the equilibrium of the furnace.

In one embodiment of my invention, a mixture consisting essentially of particles of water granulated slag and particles of silica bearing mineral of suitable size and in the proper proportions, as above described, are fed into the charge end of a rotary kiln. As the mixture proceeds through the kiln, the temperature of the charge rises until it reaches the area in which sintering or softening of the slag takes place. This is commonly called the hot zone where the temperature is from about 1800° to 2300° F. The charge is held within this high temperature zone for a sufficient length of time to insure that the components have been softened or plasticized. At this temperature and time, the water granulated slag also becomes bloated, due to the presence of entrapped gases in the slag. While such particles of silica and slag are rolled by the action of the rotary kiln, the silica coats and surrounds the particles of the slag, separating the particles from each other, so that there are formed spherical or globular shaped, discrete particles of substantially decreased density over the original particles.

The silica bearing material is preferably substantially free of chemically combined water. Suitable siliceous material includes silica flour, fire clay 28 mesh to fines, and pulverized fire brick.

The finely divided, separating material for use in my process, while preferably siliceous in nature, may also include such materials as pulverized lime, limestone, magnesia, magnesium carbonate, and other finely divided refractory compounds. It will, of course, be understood that the limestone and magnesium carbonate will decompose to CaO and MgO under the temperature conditions of the process, so that the separating material is in reality the CaO and MgO.

Just as in the case of the silica bearing minerals, it is also preferable to avoid the use of hydrated lime. Using hydrated lime ($Ca(OH)_2$) as a separating compound, there were produced light weight globules from water granulated slag. This aggregate, however, weighed 18 lbs. per cubic foot, the particles being −4 to +10 mesh. This further shows that, when combined water is present, heavier aggregates are produced than when it is absent.

The separating materials which are suitable in the practice of this invention are those refractory compounds and elements which in finely pulverized condition do not soften or become sticky at the temperatures present in the rotary kiln, that is, not until temperatures of above 2300° F. are reached. Thus, while silica bearing materials, lime and magnesia, are eminently suitable, iron oxide and pulverized slag soften before 2300° F. and tend to produce large agglomerates.

The particle size of the separating material is critical, as above mentioned and as shown in Chart I. In general, the particle size should be −20 mesh, and preferably −65 mesh.

The following example is given to illustrate the invention.

In this example, I used a typical air dried, water granulated slag, having the following chemical analysis:

Ingredients: Percent by weight
- Moisture _____ 9.00
- Silica _____ 39.12
- Aluminum oxide _____ 12.96
- Calcium oxide _____ 41.88
- Magnesium oxide _____ 2.25
- Sulphur trioxide _____ 1.12

The screen analysis was as follows:

*Screen analysis*

| | Percent |
|---|---|
| Retained on 4 mesh | 6 |
| Retained on 6 mesh | 4 |
| Retained on 8 mesh | 6 |
| Retained on 10 mesh | 14 |
| Retained on 14 mesh | 22 |
| Retained on 20 mesh | 21 |
| Retained on 28 mesh | 9 |
| Retained on 48 mesh | 11 |
| Retained on 65 mesh | 2 |
| Through 65 mesh | 5 |

*Example.*—I took the above described air dried water granulated slag through 3 mesh screen, including all fines, and mixed it with ⅓ by weight of 140 mesh pulverized silica. This mixture was fed uniformly in a small gas-fired rotary kiln, 30 inches long and 12-inch inside diameter. The feed was approximately one-half pound per minute and so regulated that it became red after traveling half the length of the kiln. Exhaust temperatures were held between 1900° F. and 2000° F. When the fines and silica dust were screened out, the resulting bloated slag was in the form of smooth-surfaced globules and weighed 25 lbs. per cubic foot, loose, retained on 28 mesh. Of the aggregate, 52 percent would float. Improved results were obtained by removing the tramp iron before bloating.

The chemical analysis of the bloated slag globules was as follows:

| Ingredients: | Percent by weight |
|---|---|
| Moisture | 0.04 |
| Silica | 42.52 |
| Aluminum oxide | 12.20 |
| Calcium oxide | 41.26 |
| Magnesium oxide | 2.35 |
| Sulphur trioxide | 0.51 |

The bloated slag was again put through the rotary expanding furnace and the temperature measured to determine if an increase in refractoriness had been developed. It was found necessary to raise the furnace temperature to 2200° to 2300° F. before the silica-coated surface started to sinter together in a conglomerated mass. This same action had taken place with the untreated water granulated slag at 1900° to 2000° F.

To further determine the value of this aggregate as a refractory material, 30 percent water granulated slag as received, and 30 percent water granulated slag, bloated in pulverized silica, were substituted in a formula for refractory castables and tested at 2000° F. The water granulated slag as received remained volume stable and weighed 112 lbs. per cubic foot, while the silica bloated slag was volume stable at 2000° F., and weighed 63 lbs. per cubic foot. This shows a marked weight reduction of the silica bloated slag over the original slag and its preferred suitability in low temperature insulating castables.

I claim:

1. A process of producing a light weight aggregate which comprises forming a mixture consisting essentially of particles of water granulated slag and particles of refractory material having a softening point of above 2300° F., the particles of the refractory material having a mesh size below approximately 20 mesh and being present in amount from approximately 20 percent to 60 percent by weight of the composition, and heating the mixture in motion at a temperature at which the slag becomes plastic and the entrapped gases from the water granulated slag bloat the particles into globules 2. The process of claim 1, wherein the refractory material having a softening point of above 2300° F. is siliceous material.

3. The process of claim 1, wherein the refractory material is silica.

4. The process of claim 1, wherein the mixture is heated at a temperature between approximately 1800° and 2300° F.

5. The process of claim 1, wherein the motion of the mixture is provided by tumbling the mixture in a rotary kiln.

6. A light weight aggregate consisting essentially of globules of water granulated slag expanded by heat to a bulk density between approximately 9 and 31 pounds per cubic foot and coated with a refractory material having a softening point of above 2300° F., at least approximately 20 percent of said aggregate being floatable on water.

7. A light weight aggregate consisting essentially of globules of expanded water granulated slag coated with a finely divided silica bearing mineral having a softening point of above 2300° F., said expanded water granulated slag being obtained by heating water granulated slag to bring about substantial expansion thereof, at least approximately 50 percent of said aggregate being floatable on water.

References Cited in the file of this patent

UNITED STATES PATENTS

| | | |
|---|---|---|
| 1,028,903 | Ottmann | June 11, 1912 |
| 1,996,452 | Bjorkman | Apr. 2, 1935 |
| 2,017,889 | Bowyer | Oct. 22, 1935 |
| 2,023,511 | Brosius | Dec. 10, 1935 |
| 2,442,519 | Schuetz | June 1, 1948 |
| 2,494,999 | Halkins | Jan. 17, 1950 |
| 2,744,021 | Bargezi | May 1, 1956 |
| 2,793,957 | Mangold et al. | May 28, 1957 |
| 2,880,100 | Ulfstedt | Mar. 31, 1959 |